United States Patent [19]

Rivoir

[11] 3,722,094
[45] Mar. 27, 1973

[54] MEANS FOR THE RESILIENT SECURING OF TOOTH SUBSTITUTES

[76] Inventor: Karl Heinz Rivoir, 15 Kiehnlestrasse, 753 Pforzheim, Germany

[22] Filed: Aug. 27, 1970

[21] Appl. No.: 67,394

[30] Foreign Application Priority Data

Aug. 29, 1969 Germany................P 19 43 932.8

[52] U.S. Cl........................................................32/2
[51] Int. Cl...............................................A61c 13/00
[58] Field of Search............................................32/2, 8

[56] References Cited

UNITED STATES PATENTS

| 2,880,508 | 4/1959 | Lester et al.................................32/2 |
| 2,854,746 | 10/1958 | Lester et al.................................32/2 |

FOREIGN PATENTS OR APPLICATIONS

| 501,514 | 11/1954 | Italy.............................................32/2 |
| 540,182 | 3/1956 | Italy.............................................32/8 |

*Primary Examiner*—Robert Peshock
*Attorney*—Robert H. Jacob

[57] ABSTRACT

Means for the resilient and preferably releasable mounting of tooth replacements or substitutes, particularly individual teeth in a plate or bridge or the like, where elastic yielding in axial as well as radial direction is possible, and where a support member is provided on the tooth which engages a supporting housing of the plate or the like with axial and radial tolerance, and between supporting member and supporting housing an axially and radially effective supporting spring or other elastically effective member is provided and the supporting member and the supporting housing having corresponding sliding, rolling or other engagement surfaces that permit a laterally directed tilting or relative movement and an axial movement between the supporting member and supporting housing.

10 Claims, 3 Drawing Figures

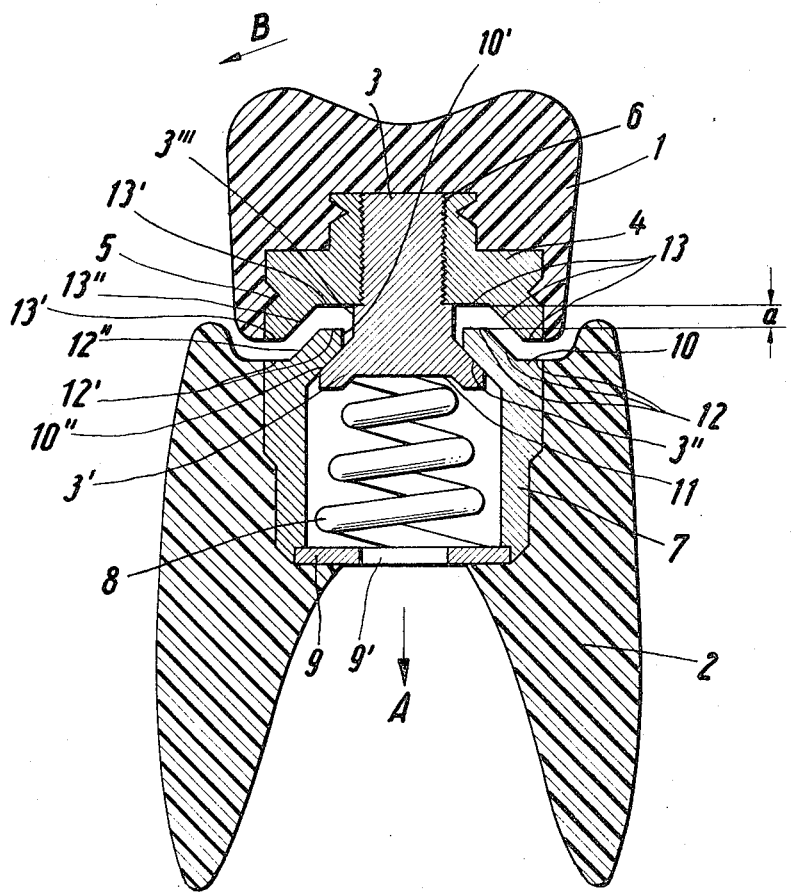

MEANS FOR THE RESILIENT SECURING OF TOOTH SUBSTITUTES

BACKGROUND OF THE INVENTION

The present invention relates to dentures and bridges or the like, and is especially concerned with means for releasably securing replacement teeth. More in particular, the invention relates to means for resilient and preferably releasable securing of replacement teeth, particularly individual teeth in a plate, a bridge or the like, while making possible elastic yielding of the tooth mounting support in axial direction, i.e., in longitudinal direction of the tooth, as well as also in radial direction. The protection for the invention is intended to cover simultaneously the tooth replacements proper, i.e., artificial teeth, protheses or plates, bridges, etc., that are provided with such means.

For this purpose a tooth support is known that utilizes a rubber cushion which is encompassed by a support plate of metal. However, such an arrangement is not usable in practice, alone for the reason that metal plates are no longer employed. In the plastic plates that are customarily used today, it is no longer possible to employ the arrangement in accordance with the prior art for the reason that the resistance of the plastic is less than that of metal. There furthermore is the shortcoming that the rubber cushion is not protected against the effects of any chewing pressures that are too strong. Therefore, it is chewed and crushed in a relatively short time. Also the rubber cushion is not capable of flawlessly moving the tooth back into its original position after a sidewise displacement upon release of the chewing pressure.

Furthermore, tooth securement means are known in the form of push buttons, or by means of a pressure spring operating in the longitudinal direction of the tooth. In the first mentioned case, resilient intersecting or dampening of the chewing pressures is not possible at all, in the second case only the axial but not the radial pressures are intercepted or dampened. The same applies for the supporting of a tooth plate on a jaw plate by means of several springs where the tooth plate has a circumferential border that engages an exactly fitting recess in the jaw plate.

It is an object of the invention to so form a device of the type aforementioned, while avoiding the shortcomings described, so that flawless resilient reception or absorption of the chewing pressure takes place, and that, independently of the direction in which the chewing pressure is exerted. At the same time, the spring element that absorbs the chewing pressure is to be protected against excessive wear. Furthermore, the spring element must press back the substitute tooth into the original position flawlessly as the chewing pressure is decreased. Inasmuch as the invention is intended to serve for resilient support especially of individual teeth, the further requirement exists to accommodate the means for the fastening of a single tooth in the relatively small space that is available. At the same time installation in the most commonly used plastic plates should be possible.

SUMMARY OF THE INVENTION

It is, therefore, one object of the invention to provide a supporting element known per se on the tooth which engages a supporting housing of the prothesis or plate, or the like, with axial and radial tolerance, that between supporting element and supporting housing a supporting spring that is effective axially and radially, or a suitably effective elastic resilient member, is provided and that the supporting member and the supporting housing have mutually corresponding sliding, rolling or other engagement surfaces which permit tilting or relative movements and an axial movement between the supporting member and the supporting housing. Several advantages are thereby obtained. Due to the cooperation of the radial and axial tolerance with the sliding and supporting surfaces, resilient yielding of the replacement tooth in any position is possible. Owing to the resetting force of the spring and of the guidance provided by the sliding surfaces, the tooth may return automatically after decrease of the chewing pressure into the original position. The spring which suitably is provided in the supporting housing can be made so strong that it withstands also high chewing pressures. The arrangement described above, respectively its components, can be produced as minimum or minute turning parts or chiplessly formed individual parts with the very small dimensions required. This makes possible the observance of the required precision at relatively small production costs.

In accordance with a preferred embodiment of the invention there exists for the tooth without load a small axial distance between a corresponding supporting or sliding surface of the supporting element of the tooth, on the one hand, and the counter surface of the supporting housing that is fastened in the plate or prothesis, which determines the course along which the supporting spring may be compressed under very strong chewing pressures. The arrangement is such that with a chewing pressure which exceeds the permissible amount the two aforementioned supporting surfaces come into engagement. These supporting surfaces then can absorb all chewing forces which exceed the permissible amount. Thus, a safeguard is provided that the supporting spring is not damaged or destroyed by unreasonably high chewing pressure.

BRIEF DESCRIPTION OF THE DRAWINGS

Further advantages and features of the invention will become apparent from the following description with reference to the embodiments illustrated in the drawings, in which:

FIG. 2 is a section along line II—II of FIG. 1, drawn to an enlarged scale.

DESCRIPTION OF THE INVENTION

Figure 1:
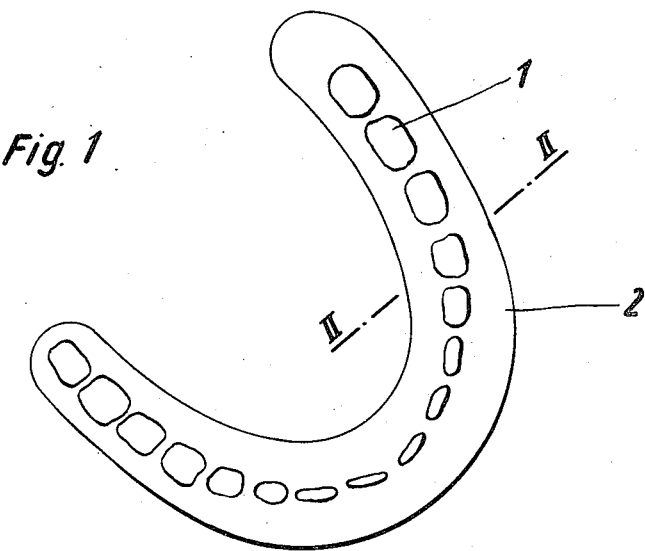
FIG. 1 is a schematic perspective view of a tooth prothesis with teeth in accordance with the invention secured therein.

The invention serves particularly for anchoring individual teeth 1 in a plate 2, preferably a plastic prothesis (FIGS. 1 and 2). Furthermore, the invention can also be employed for installation of teeth in bridges or in pin or crown teeth. It can likewise be successfully seated in the anchoring for several teeth combined into a bridge to constitute a prothesis in the jaw, or in still existing natural teeth. A further possibility of use exists in accordance with FIG. 3 in the form of an implant, i.e., replacement tooth directly embedded in the jaw bone.

A supporting member is provided on the tooth 1 which consists of the supporting bolt 3 and the base 4. The base 4 is firmly embedded in the tooth, for example glued in with the aid of an annular groove 5. Base and supporting bolt may be connected with one another, either fixedly or releasably, for example by threads 6.

The bolt 3 engages with axial and radial tolerance the supporting housing 7 which is securely anchored in the prothesis or the like 2. A releasable anchorage, for example in the form of a resilient snap support, permits easy and rapid exchange of the tooth. In accordance with this embodiment the supporting housing 7 may be a hollow cylinder and receive in it the supporting spring 8. One end surface of this hollow cylinder is covered by a bottom disk 9, which after seating of the supporting bolt 3 and of the spring 8 is secured in the position shown. The bottom disk 9 may be provided with a bore 9' in accordance with one embodiment, which permits of rinsing the space in which spring 8 is located. However, if it is desirable for reasons of dental technique to provide a full cover for this space, the disk 9 may also be made without a bore. The other end surface of the supporting housing is defined especially by a counter bearing wall 10 to be described more in detail, which has a bore 10' for passing through the shaft 3''' of the supporting bolt 3. The spring 8 is supported at one end on the bottom disk 9 and at its other end on the end surface 11 of the supporting bolt 3. This end surface may be provided with a circular recess which prevents lateral sliding of the spring. Besides, it is advisable that the spring as illustrated enlarges conically from the end surface 11 to the bottom disk 9.

The sliding, rolling or engagement surfaces of the supporting member and of the supporting housing in accordance with the embodiment shown operate as follows:

The supporting bolt 3 reaches with its head 3' behind the bearing wall 10. It has a supporting surface 3'' which, when the tooth is not under pressure, engages the counter engagement surface 10'' of the abutment wall under the effect of spring 8. In addition the abutment wall has at its side facing the base 4 a supporting and sliding surface 12 which is defined by two horizontal end sections 12' and a center section 12'' which extends conically and is disposed therebetween. The counter surface of the base 4 that is suitably formed is identified by numerals 13—13''. The shape of the support and sliding surfaces may also be different, for example, entirely straight or conical, or curved. Curved surfaces that can roll upon one another result in particularly small wear. In forming the supporting and sliding surfaces it must be considered that they make possible elastic yielding when the spring 8 is completely or partially compressed, which corresponds to the chewing pressure, but as maximum permissible chewing pressure is attained, they engage one another in a manner that also very heavy chewing forces are faultlessly absorbed by the supporting element and the supporting housing.

As shown in the drawing, the remaining sliding surfaces 3'', 10'' extend parallel to the center section 12'', 13'' of the sliding surfaces. The axial distance $a$ that exists between the supporting surfaces 12, 13 while the tooth is not under pressure corresponds to the distance by which the supporting spring 8 is compressed under chewing pressure that is still permissible.

Under axial pressure the spring 8 is compressed in the direction of the arrow A while the tooth 1 follows this movement. With a tilting or rocking movement of the tooth, or in a direction of force according to arrow B, the spring 8 is also compressed, but only in one direction. In this connection only sliding of surfaces 3'' and 10'' on one another can take place. However, also in this case, forces that are too great are intercepted in that surfaces 12 and 13, especially their outer partial sections 12', 13', come into engagement with one another. With a chewing pressure in oblique direction there takes place an axial pressing in of the tooth support as well as also toward the side. In order to prevent wedging of the support bolt 3 in the bore 10' even in the most unfavorable case, the dimensions of these parts are so chosen, that the outer wall 3''' of the bolt does not come into contact with the inner wall of the bore 10'.

Figure 3:
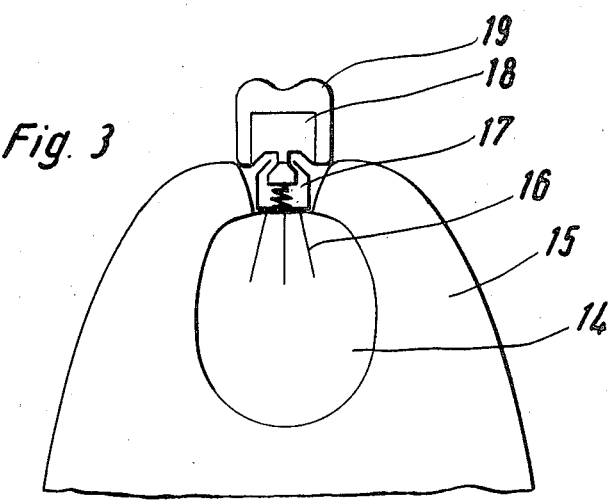
FIG. 3 illustrates schematically and to a different scale the mounting of a tooth directly in the jawbone.

FIG. 3 illustrates schematically a jaw bone 14 with the surrounding gum flesh 15. In the bone a supporting housing 17 is set in or recessed in the manner of an implant over parts 16. On it are fastened the bolt and the base part 18 as well as the tooth 19. The spring support and support of forces in accordance with the invention is especially useful with implants.

In lieu of the spiral spring 8, it would also be possible to provide a different suitably effective member of different construction that is resilient.

The elements described can be accommodated in a minimum of space, while due to the threading between bolt 3 and base 4 removal of the spring element from the tooth is possible. The surface of the supporting housing 7 supporting itself in the prothesis can be selected of such magnitude that the permissible specific pressure load of the plastics for such protheses is not exceeded.

Having now described my invention, what I desire to protect by letters patent of the United States is set forth in the appended claims.

I claim;

1. Means for the resilient mounting of tooth replacements such as individual teeth in a prothesis, having a plate or bridge permitting yielding of the tooth support axially as well as radially, comprising a tooth having a supporting element, a prothesis provided with a supporting housing for engagement by said supporting element and a resilient element disposed between said supporting element and said supporting housing adapted to yield axially and radially, said supporting element and said supporting housing having corresponding axially extending sliding engagement surfaces and laterally extending engagement surfaces permitting axial and radial movement intermediate said supporting element and said supporting housing.

2. Means in accordance with claim 1 where said engagement surfaces extend outwardly and are directed toward the prothesis.

3. Means in accordance with claim 2 where said supporting element comprises a base member and a bolt and said supporting housing has a counter bearing wall for said bolt, and where said resilient element is a spring disposed intermediate said housing and said bolt biasing said bolt against said counter bearing wall.

4. Means in accordance with claim 3 where said bearing wall defines a bore and the diameter of said bore is greater than the diameter of said bolt.

5. Means in accordance with claim 4 where said base and said counter bearing wall present oppositely disposed engagement surfaces, said spring being adapted to yield a predetermined distance, and said engagement surfaces being spaced from one another when said tooth is free of chewing pressure by a space corresponding to the distance that said spring is adapted to yield.

6. Means in accordance with claim 5 where said supporting bolt has a part opposite said counter bearing wall defining a sliding surface cooperating with a corresponding sliding surface on said counter bearing wall.

7. Means in accordance with claim 6 where said corresponding sliding surfaces on said base and on said supporting housing extend substantially parallel to corresponding sliding surfaces between said counter bearing wall and said supporting bolt.

8. Means in accordance with claim 7 where said supporting housing defines a hollow cylinder having one end surface defined by said counter bearing wall and another end surface defining the bottom of said cylinder and where said one end of said spring engages said bottom in said cylinder.

9. Means in accordance with claim 8, characterized in that the end surface of the supporting bolt presents a recess adapted to receive the other end of said spring.

10. Means in accordance with claim 9 where the individual tooth and the prothesis receiving the same are releasable, by means of threaded engagement portions.

* * * * *